C. McDERMOTT.
Iron-Wedge.

No. 159,949. Patented Feb. 16, 1875.

WITNESSES:
G. Matthys.
A. W. Cart

INVENTOR:
Chas. McDermott
BY
ATTORNEYS.

THE GRAPHIC CO.PHOTO-LITH.39 & 41 PARK PLACE, N.Y.

UNITED STATES PATENT OFFICE.

CHARLES McDERMOTT, OF OAKLAND STATION, ARKANSAS.

IMPROVEMENT IN IRON WEDGES.

Specification forming part of Letters Patent No. 159,949, dated February 16, 1875; application filed January 6, 1875.

*To all whom it may concern:*

Be it known that I, CHARLES McDERMOTT, of Oakland Station, in the county of Drew and State of Arkansas, have invented an Improvement in Iron Wedges; and I do hereby declare that the following is a full, clear, and exact description of the same, reference being had to the accompanying drawing, forming a part of this specification, in which—

Figure 1:
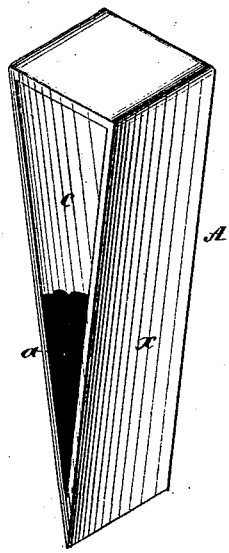
Figure 2:
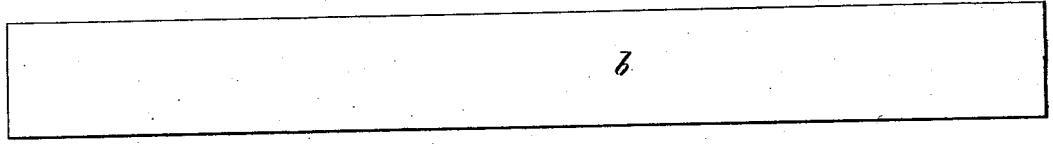
Figure 3:
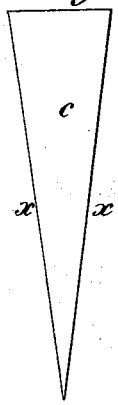

Figure 1 is a perspective view of the wedge, with part broken out to show the chamber. Fig. 2 is a plan view of the piece composing the inclined sides and head or top of the wedge. Fig. 3 is a plan view of one of the vertical side pieces.

Iron wedges for splitting wood have been ordinarily made entirely solid, but in some instances they have been made solid in the lower half or third only, and a wooden block inserted in the cavity of the upper part to form the head of the wedge, and thus adapt it to be driven by an iron maul. Both of these forms of wedges have defects that are obviated by mine, which has the shape of the solid wedge exteriorly, but is entirely hollow, or has a closed chamber. It is constructed of plates, shaped, arranged, and united, as hereinafter described.

In the drawing, *a* indicates the chamber of the wedge. Its parallel sides are formed of triangular plates *c c*, and the head and inclined sides of the plate *b* of rectangular form, said parts being firmly welded together.

For the material I prefer steel, in order to combine strength and lightness in the highest degree.

A wedge thus constructed weighs but one-third to one-fourth as much as a solid wedge of the same size, and is for that reason cheaper.

It is evident that if a maul weighing ten pounds be used with a view to drive a wedge weighing a hundred pounds, no effect would be produced, the force of impact being insufficient to overcome the relatively great inertia of the wedge. But if the distribution of size or weight be reversed, the wedge being made to weigh ten pounds and the maul a hundred, it is clear a light blow would be sufficient to drive the wedge to the head. Thus, in every case, the penetrative force of the wedge, other things equal, is proportioned to the weight of the maul, minus the inertia of the wedge.

But it is impracticable to use a maul exceeding the weight of those now generally employed, and it is even very desirable they should be lighter. With my improved wedge much greater effect can be produced by use of the common maul than with a solid wedge of the same size, while at least an equal effect can be produced with a maul from one-half to one-third lighter. Thus the hollow wedge is superior in lightness, economy, and practical use.

What I claim is—

As a new article of manufacture, the wedge formed of plates *b c*, welded together at their contiguous or meeting edges, thus forming a closed chamber, *a*, as shown and described.

CHARLES McDERMOTT.

Witnesses:
 J. B. DANIELS,
 E. P. WILLIAMS.